US006885530B2

(12) United States Patent
Wenzel

(10) Patent No.: US 6,885,530 B2
(45) Date of Patent: Apr. 26, 2005

(54) POWER LIMITING TIME DELAY CIRCUIT

(75) Inventor: Edward P. Wenzel, Northbrook, IL (US)

(73) Assignee: STMicroelectronics, Inc., Carrollton, TX (US)

( * ) Notice: Subject to any disclaimer, the term of this patent is extended or adjusted under 35 U.S.C. 154(b) by 306 days.

(21) Appl. No.: 10/166,876

(22) Filed: Jun. 11, 2002

(65) Prior Publication Data

US 2003/0227729 A1 Dec. 11, 2003

(51) Int. Cl.[7] .............................. H02H 7/00; H02H 9/00

(52) U.S. Cl. .......................................... 361/91.3; 361/18

(58) Field of Search ......................... 361/91.3, 18, 91.1; 307/140; 363/49

(56) References Cited

U.S. PATENT DOCUMENTS 4,195,333 A * 3/1980 Hedel ...................... 363/21.07
4,621,313 A * 11/1986 Kiteley ........................ 363/49
4,672,228 A * 6/1987 Swoboda ....................... 307/66
5,307,256 A * 4/1994 Silverstein ................... 363/49
5,581,246 A 12/1996 Yarberry et al. ....... 340/825.57
5,608,313 A 3/1997 Kramer ...................... 323/269
5,623,198 A 4/1997 Massie et al. ............. 323/282
5,703,765 A 12/1997 Preis ........................... 363/21
5,736,884 A 4/1998 Ettes et al. ................. 327/304
5,808,377 A 9/1998 Massie et al. ................ 307/80
5,932,990 A 8/1999 Kaneko ...................... 320/122
5,973,940 A 10/1999 Rehm et al. .................. 363/21
6,040,778 A * 3/2000 Hopkins et al. ............ 340/650
6,166,923 A 12/2000 Rehm et al. .................. 363/19
6,288,881 B1 * 9/2001 Melvin et al. ................ 361/18

* cited by examiner

*Primary Examiner*—Zeev Kitov
*Assistant Examiner*—F Ritz
(74) *Attorney, Agent, or Firm*—Lisa K. Jorgenson; Christopher F. Regan

(57) ABSTRACT

A power limiting circuit for power supply that is controlled by a power supply control module includes a shunt regulator having a reference input operatively connected to a voltage input that receives a voltage representative of the power supply control module connected thereto. The shunt regulator is biased on when the voltage at the reference input increases above a reference voltage established at the voltage input. A transistor is operatively connected to the shunt regulator and to an output operatively connected to the power supply control module and has a voltage that is representative of voltage operating the power supply control module. The transistor is biased on from the shunt regulator such that the shunt regulator and transistor form a latch when the voltage at the output reduces below an off voltage level to turn off the power supply, dropping the input voltage, and restarting the power supply in a restart cycle.

24 Claims, 2 Drawing Sheets

POWER SUPPLY 12
CONTROL MODULE 14
ERROR AMP 15
18 Vdd 16 Vcomp 20 Vbulk
R3 32 R4 40 R7 36 10
Q1 R2 48 C1 34 R8 38
30 U1 28 24 22 26
R1 46 R5 42
R6 44

POWER LIMITING TIME DELAY CIRCUIT

FIELD OF THE INVENTION

This invention relates to the field of power supplies, and more particularly, this invention relates to a power limiting time delay circuit that satisfies load requirements for a power supply.

BACKGROUND OF THE INVENTION

Printers and other similar electronic devices use a power supply control module that controls a power supply having a load requirement that often requires a nominal output power, a heavy output power for a short period of time, and a power limit for a period of time that is outside the period of time required for the heavy output power. In order to decrease the chance of power supply failure, some power supplies for these type of devices have been designed to withstand heavy output power by over designing the requirements of the power supply. Other power supplies have complicated, expensive circuits with numerous power transistors and other devices that increase the complexity, expense and maintenance costs of the power supply. These complicated circuits also require a delay circuit that works in conjunction with the complicated power supply and control circuits.

It would be advantageous if a more simple circuit could satisfy these types of load requirements when added to a power supply designed thermally for a nominal output power. Any type of circuit used for these power limiting requirements should include a time delay that takes advantage of the power supply and be capable of the required heavy output power for a short period of time. A simple circuit would also be advantageous if it limits the output power beyond any time allocated for the heavy output power.

SUMMARY OF THE INVENTION

It is therefore an object of the present invention to provide a simple power limiting circuit that overcomes the disadvantages as noted above.

It is yet another object of the present invention to provide a simple power limiting circuit with an appropriate delay that is capable of a heavy output power for a short period of time to overcome the disadvantages of prior art devices as noted above.

The power limiting circuit of the present invention is used for controlling a power supply and its associated power supply control module. A shunt regulator has a reference input operatively connected to a voltage input that receives a voltage indicative of the power supply control module error for an amplifier of the power supply control module connected thereto. The shunt regulator is biased on when the voltage at the reference input increases above a reference voltage established at the voltage input. A transistor is operatively connected to the shunt regulator and to an output operatively connected to the power supply control module and has a voltage that is representative of the voltage operating the power supply control module. The transistor is biased on from the shunt regulator such that the shunt regulator and transistor form a latch. The voltage at the output reduces below an off voltage level to turn off the power supply, dropping the input voltage and restarting the power supply in a restart cycle.

In yet another aspect of the present invention, the power limiting circuit includes a time delay circuit operatively connected to the shunt regulator for delaying the biasing on of the shunt regulator. This time delay circuit can include a transistor and capacitor operatively connected to the reference input of the shunt regulator.

This shunt regulator comprises a three-terminal integrated circuit having an anode, cathode and reference input. The transistor comprises a bipolar transistor having an emitter connected to the output representative of the operating voltage of the power supply control module. A bulk voltage input and resistor divider circuit are operatively connected to the reference input of the shunt regulator such that the bulk DC voltage of the power supply establishes a voltage threshold for the shunt regulator. As the voltage increases, the voltage required to bias the shunt regulator on will decrease.

A method of controlling a power supply is also set forth and includes the steps of sensing an input voltage to a power control circuit that is representative of the output power of the power supply. If an excess output power threshold is exceeded within a period of time, the method further comprises the step of maintaining the power supply in a normal operating condition but restarting the power supply in a restart cycle with an output power less than a specified limit if the excess output power threshold is exceeded beyond the specified period of time.

The power supply is maintained in a normal operating condition but the power supply is restarted in a restart cycle with an output power less than the specified limit if the excess power threshold is exceeded beyond the specified period of time.

The restart cycle is continued as long as the excess output power threshold remains. A normal operating condition on the power supply is continued when the excess output power beyond the output power threshold is removed.

In yet another aspect of the present invention, the voltage threshold is established at an input connected to a power supply control module by measuring DC voltage corresponding to a rectified AC input voltage such that the voltage at the input increases when there is an increase in load and a decrease in AC input voltage. The input can correspond to an output voltage for a power supply control module error amplifier in one aspect of the invention. The method further comprises a step of pulling below an off voltage level when there is an excess load for initiating a restart cycle.

In yet another aspect of the present invention, the method forms a latch within the power control circuit using a shunt regulator and transistor such that the voltage at the output will reduce below the off voltage level to turn off the power supply, dropping the input voltage and restarting the power supply in a restart cycle.

In yet another aspect of the present invention, the power supply is started when excess power is removed and the power is maintained in a continuous restart cycle when excess power remains.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
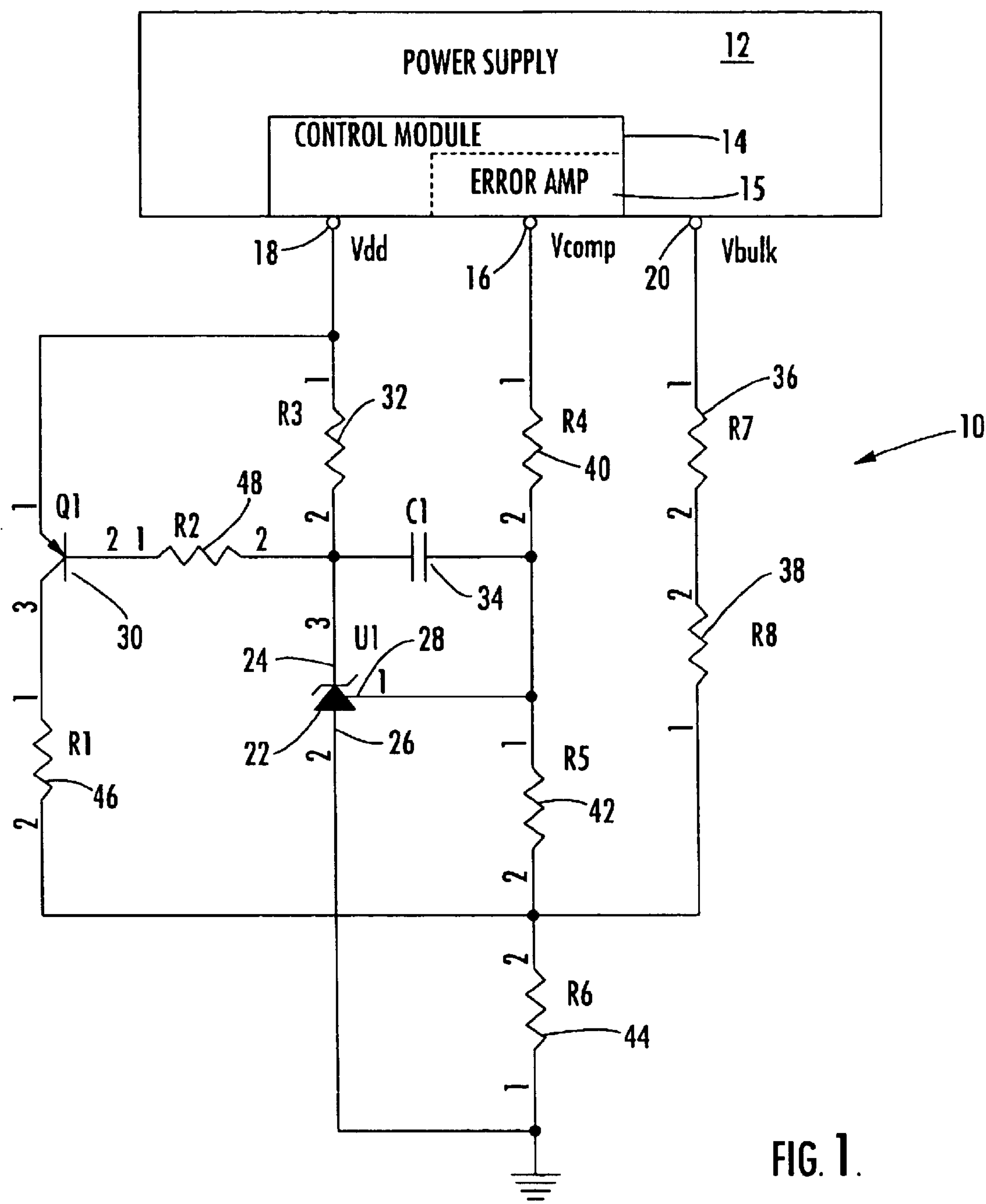
FIG. 1 is an electrical schematic circuit diagram of the present invention and showing in detail the power limiting time delay circuit.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention overcomes the disadvantages of prior art circuits used to control power supply load requirements that vary at different times, such as found for some printers and associated devices. Some printers and similar devices require a nominal output power, a heavy output power for a short period of time, and a power limit for a period of time outside the period of time used for heavy output power. The present invention is a simplified power limiting circuit that is advantageous over prior art circuits that have controlled the loads by either over designing the power supply or adding a complicated and expensive circuit as an add-on circuit.

The simple, but efficient power limiting circuit of the present invention satisfies the load requirements when added to a power supply thermally designed for a nominal output power. The circuit of the present invention includes a delay and takes advantage of the power supply requirements capable of the heavy output power for a short period of time. The circuit of the present invention also limits the output power beyond the time allocated for that heavy output power.

The present invention will now be described with reference to FIG. 1, where a description of the various components are set forth, followed by the description of the circuit operation.

As illustrated, the power limiting circuit 10 is connected to a power supply 12 as known to those skilled in the art, which provides power to a printer or other associated device having the load requirements of a nominal output power, heavy output power for a short period of time, and a power limit for a period of time that is outside the period of time required for heavy output power. This power supply 12 includes a control module 14 with an error amplifier 15 as known to those skilled in the art. The power limiting circuit 10 is shown by the schematic circuit diagram and includes a Vcomp input 16 and Vdd output 18 and a DC bulk voltage input 20.

The circuit 10 includes a shunt regulator U1 (22) having the three terminals of a cathode 24, an anode 26 and a reference input 28. The cathode 24 is connected to Q1, a bipolar transistor 30, formed as a PNP type of bipolar transistor that includes a collector, emitter and base. Resistor R3 (34) is connected to Vdd output 18. As will be explained below, resistor R4 (40) and capacitor C1 (34) are arranged in an L-configuration and connected to Vcomp input 16 to provide a time delay circuit. Resistors R7 and R8 (36, 38) are connected to the Vbulk input 20 and resistors R4, R5 and R6 (40, 42, 44) are connected to the Vcomp input 16 to provide a voltage divider circuit. Resistor R1 (46) is connected to the collector of the bipolar transistor and resistor R2 (48) is connected to the base of the bipolar transistor.

The shunt regulator can be a TL-431 integrated circuit, such as manufactured by Texas Instruments, and has high stability, typically working better than feedback resistors. Because it is a shunt regulator, excessive voltage can drop on other resistors (and not the integrated circuit) and can control far more output power than other similar types of components. The output voltage can be set to any value, usually between a reference of approximately 2.5 volts and 36 volts. The circuit usually has a typical output impedance of about 0.2 ohms. The shunt regulator has sharp turn-on characteristics and on-board regulation with adjustable power supplies and switching power supplies. It typically has an equivalent full-range temperature coefficient of about 30 ppm/C° and a sink/current capability of one milliamp to about 100 milliamps with low output noise.

The power limiting circuit 10 of the present invention senses an input voltage, which represents the output power from the power supply 12. While the power supply is operating at normal output power, the circuit has no effect. If an output power threshold is exceeded for a specified period of time, the power supply 12 will continue running normally. If an output power threshold is exceeded beyond the specified period of time, the circuit will restart the power supply with an output power less than a specified limit. The restart cycle will continue as long as the output power remains. At this time, the power supply will start and continue normal operation when the excess output power is removed.

Referring again to FIG. 1, the non-limiting example of the power limiting circuit 10 is illustrated as a schematic circuit diagram of the present invention. The input to the power limiting circuit 10 is the voltage at Vcomp input 16, which is the output to the power supply control module error amplifier 15. The voltage at Vcomp input 16 increases when there is an increase in load and a decrease in AC input voltage. In order to compensate for the input voltage variation, the DC bulk voltage input 20 (Vbulk rectified AC input voltage) is sensed. The result is a voltage threshold at the Vcomp input 16, which decreases with an increase in input voltage. The output of the circuit 10 is at Vdd output 18, which is the voltage from which the power supply control module 14 operates. Vdd is pulled below the Vdd off level when there is an excess load.

The divider resistors R4, R5 and R6 (40, 42, and 44) are used to sense the Vcomp input 16. The input voltage across R5 and R6 (42, 44) is the input to the shunt regulator U1 (22) at pin1 for the reference input 28. As noted before, this type of adjustable, precision shunt regulator can have an equivalent full range temperature coefficient of 30 PPM/degrees C. It has a specified thermal stability over applicable automotive, commercial and military temperature ranges. The active output circuitry allows a sharp turn-on and acts as a replacement for Zener diodes, including onboard regulation, adjustable power supplies, and switching power supplies.

When the voltage at Vcomp input 16 increases, the voltage at pin1 for the reference input 28 increases above the reference voltage, and the shunt regulator 22 (U1) turns on. The time constant from capacitor C1 (34) and R4 (40) provides the delay for the shunt regulator U1 (22) turn on. The divider resistors R7 and R8 (with R6) (36, 38 and 44) are used to sense the input bulk DC voltage at Vbulk input 20. The voltage at R6 (44) increases with increased bulk voltage and will reduce the voltage needed to turn on the shunt regulator U1 at the pin1 reference input 28.

After the shunt regulator U1 (22) turns on, the voltage across R3 (32) turns on the PNP transistor Q1 (30). The Q1 collector current increases and the voltage at R6 (44) increases, which turns the shunt regulator U1 (22) on to a greater extent. The bipolar transistor Q1 (30) and the shunt regulator U1 (22) form a latch. The shunt regulator current through R3 (32) will reduce Vdd output 18 below the Vdd off voltage and the power supply will turn off. Vcomp input 16 will then drop, and the power limiting circuit 10 will turn off. At this time, the power supply will go into a start up mode. If the excess power is removed, the power supply will start, but if the excess power remains, the power limiting circuit 10 will cause a continuous start up mode.

Figure 2:
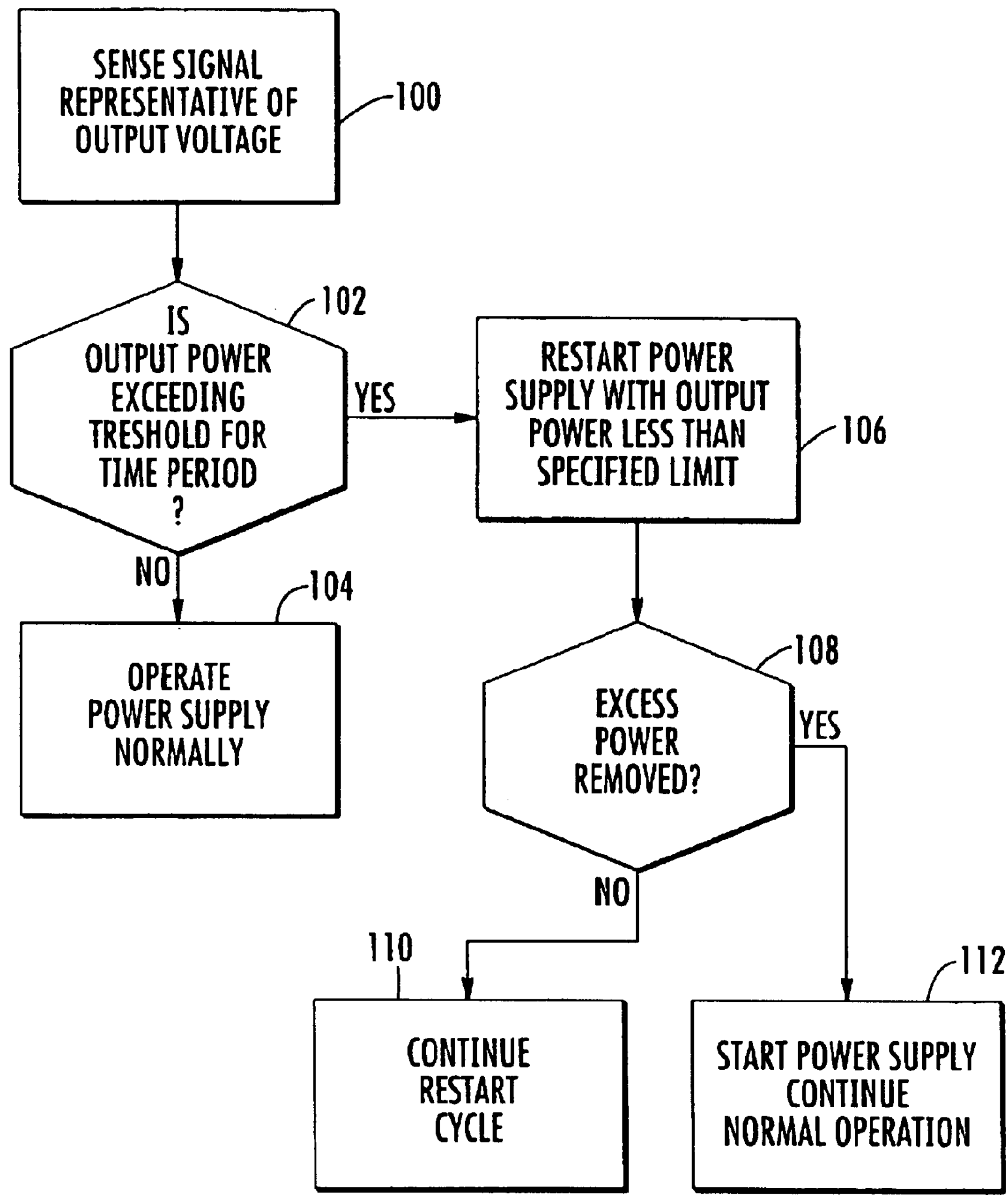
FIG. 2 is a flow chart of the basic method of operation of the power limiting time delay circuit of the present invention.

FIG. 2 illustrates a flow chart for the method of operation for the present invention using the power limiting circuit shown in FIG. 1. As shown at Block 100, the signal representative of the output voltage is sensed. If the output power does not exceed the threshold for a time period (Block 102), the power supply is operated normally (Block 104). If the output power exceeds the threshold for the time period, the power supply is restarted with an output power less than the specified limit (Block 106). The specified limit is the power supply requirement as desired by one skilled in the art. A decision is made whether the excess power is removed (Block 108). If no, then the restart cycle continues (Block 110). If yes, then the power supply starts and continues normal operation (Block 112).

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A power limiting circuit for a power supply controlled by a power supply control module comprising:

a voltage (Vcomp) input operatively connected to the power supply control module for receiving a voltage indicative of a power supply error;

a voltage (Vdd) output operatively connected to the power supply control module and an operating voltage for the power supply control module;

a three terminal integrated circuit shunt regulator having a cathode, an anode, and a reference input operatively connected to said voltage (Vcomp) input, said shunt regulator being biased on when the voltage to the reference input increases above a reference voltage established at the voltage (Vcomp) input;

a bipolar transistor operatively connected to said shunt regulator and being biased on from the shunt regulator such that said shunt regulator and transistor form a latch wherein the voltage at the (Vdd) output will reduce below a (Vdd) off voltage level to turn off the power supply, dropping the (Vcomp) input voltage and switching the power supply to a new cycle.

2. A power limiting circuit according to claim 1 and further comprising a time delay circuit operatively connected to said shunt regulator for delaying the biasing on of the shunt regulator.

3. A power limiting circuit according to claim 2 wherein said time delay circuit comprises a resistor and capacitor operatively connected to said reference input of the shunt regulator.

4. A power limiting circuit according to claim 1 wherein said transistor comprises a bipolar transistor.

5. A power limiting circuit according to claim 4, wherein said bipolar transistor has an emitter connected to said output representative of the operating voltage of the power supply control module.

6. A power limiting circuit according to claim 1 and further comprising a bulk DC voltage input of the power supply and a resistor divider circuit operatively connected to the reference input of the shunt regulator for sensing bulk DC voltage of the power supply and establishing a voltage threshold for the shunt regulator.

7. A power limiting circuit according to claim 6 wherein as bulk voltage increases, the voltage required to bias the shunt regulator on decreases.

8. A method of controlling a power supply comprising the steps of:

sensing an input voltage to a power control circuit that is representative of the output power supply error; and if an excess output power threshold is exceeded within a specified period of time, then maintaining the power supply in a normal operating condition, but switching the power supply to a new cycle with an output power less than a specified limit if the excess output power threshold is exceeded beyond the specified period of time.

9. A method according to claim 8 and further comprising the step of continuing the new cycle as long as the excess output power threshold remains.

10. A method according to claim 9 and further comprising the step of continuing a normal operating condition of the power supply when the excess output power beyond the output power threshold is removed.

11. A method according to claim 8 and further comprising the step of establishing a voltage threshold at an input connected to a power supply control module by measuring input bulk DC voltage corresponding to a rectified AC input voltage such that the voltage at the input increases when there is an increase in load and a decrease in AC input voltage.

12. A method according to claim 8 wherein the input corresponds to an output voltage for a power supply control module error amplifier.

13. A method according to claim 8 and further comprising the step of pulling below an off voltage level when there is an excess load for initiating a new cycle.

14. A method according to claim 8 and further comprising the steps of forming a latch within the power control circuit using a shunt regulator and transistor such that the voltage at the output will reduce below the off voltage level to turn off the power supply, dropping the input voltage and switching the power supply to a new cycle.

15. A method according to claim 14 and further comprising the step of starting the power supply when excess power is removed.

16. A method according to claim 14 and further comprising the step of maintaining the power supply in a continuous new cycle when excess power remains.

17. A method of controlling a power supply comprising the steps of:

sensing an input voltage at a (Vcomp) input of a power control circuit that is connected to a power supply control module;

biasing on a shunt regulator having a reference input that is operatively connected to the (Vcomp) input when the voltage to the reference input increases above a reference voltage; and biasing on a transistor that forms a latch with the shunt regulator such that as transistor current increases, the shunt regulator turns on more wherein the voltage at a (Vdd) output will reduce below a (Vdd) off voltage level and turn off the power supply, dropping the (Vcomp) input voltage and switching the power supply in a new cycle.

18. A method according to claim 17 and further comprising the step of delaying the shunt regulator from turning on by providing a time constant from a capacitor and resistor combination operatively connected to the reference input of the shunt regulator.

19. A method according to claim 17 and further comprising the step of sensing input bulk voltage and as bulk voltage increases, reducing the amount of voltage required to turn on the shunt regulator.

20. A method according to claim 17 and further comprising the step of continuing the new cycle as long as the excess output power threshold remains.

21. A method according to claim 20 and further comprising the step of continuing a normal operating condition of the power supply when the excess output power beyond the output power threshold is removed.

22. A method according to claim 20 and further comprising the step of establishing a voltage threshold at the (Vcomp) input by measuring input bulk DC voltage corresponding to a rectified AC input voltage such that the voltage at (Vcomp) increases when there is an increase in load and a decrease in AC input voltage.

23. A method according to claim 17 wherein the output to the power supply at the (Vcomp) input corresponds to an output to a power supply control module error amplifier.

24. A method according to claim 17 and further comprising the step of pulling below a (Vdd) off voltage level at the (Vdd) output when there is an excess load.

* * * * *